May 30, 1950  L. D. CALHOUN  2,509,960
OIL-GAS DIESEL ENGINE
Filed May 26, 1948

INVENTOR
LESLIE D. CALHOUN
BY *J. H. G. Cook*
ATTORNEY

Patented May 30, 1950

2,509,960

UNITED STATES PATENT OFFICE 2,509,960

OIL-GAS DIESEL ENGINE

Leslie D. Calhoun, Webster Groves, Mo., assignor to Fulton Iron Works Company, St. Louis, Mo., a corporation of Delaware Application May 26, 1948, Serial No. 29,254

1 Claim. (Cl. 123—27)

This invention relates to oil-gas Diesel engines, and has for its principal object the dual control and regulation of the fuel supply to said engine. In my invention I provide an extremely short passage for the gas supply between a control valve and the engine cylinder. I obtain better regulation by using a positively operated, variable lift control valve located as closely as possible to the combustion chamber (or cylinder), thereby leaving a minimum amount of gas for re-expansion between the valve and the combustion chamber; the entire control of the cylinder being handled by a variable lift valve and no additional control valves being required, which makes the engine less susceptible to pressure variations in the gas line.

The variable lift control valve is located very close to the combustion chamber and timed so that it closes before the inlet valve to the cylinder closes, which leaves absolutely no gas between the control valve and the combustion chamber to expand after the control valve is seated as the wash of air through the inlet valve passage takes all the gas with it; no line of any kind is charged with any amount of gas which would tend to retard the control of the engine. It is possible to completely and entirely balance the cylinders as reliance is not based on throttling by any control orifice or other means to equalize the amount of gas taken in by individual cylinders after a main control to the engine, as is the practice on the existing systems as far as I am aware; by maintaining practically constant fuel to air ratios and proper timing for all loads on the engine, better fuel consumption is obtainable, especially at fractional loads. Extreme safety in freedom from backfire is accomplished by keeping the air intake passages entirely free of gas at all times.

In the drawings—

Figure 1:
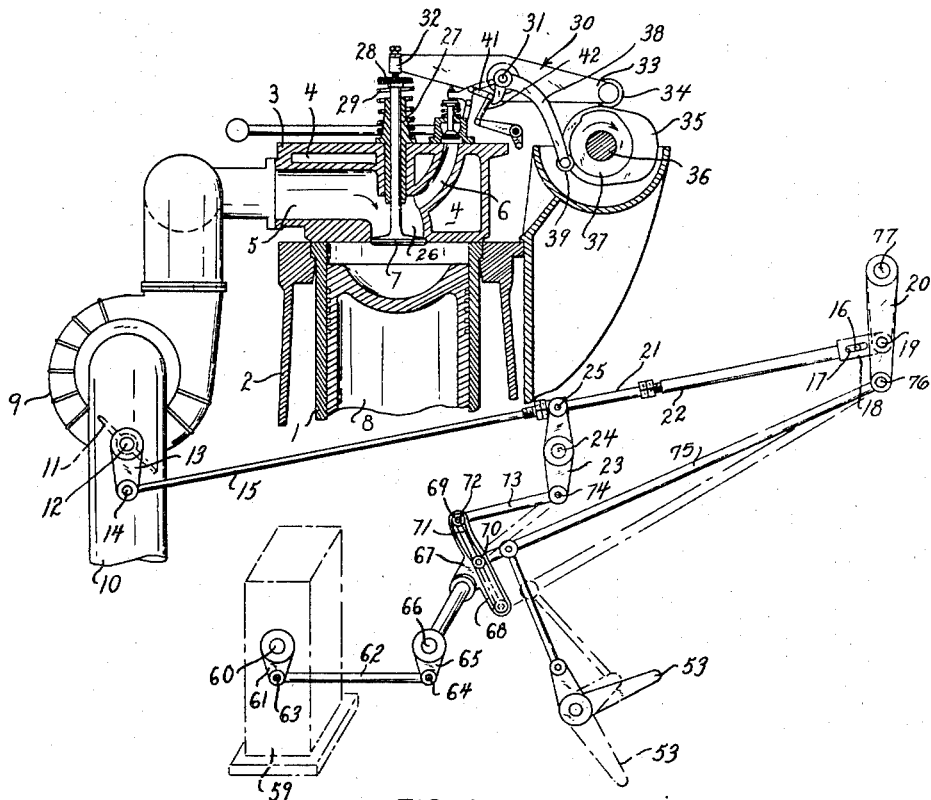
Fig. 1 is a diagrammatic view of the mechanisms for controlling the flow of air and gas to the cylinders of the engine.
Figure 3:
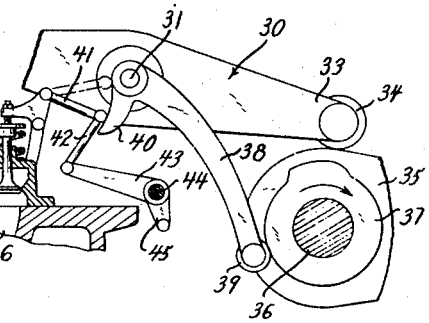
Fig. 3 is an enlarged detail view of the control mechanism for the variable lift valve.

The invention comprises a cylinder 1 surrounded by a water jacket 2 through which water is circulated for the purpose of cooling said cylinder. The top of the cylinder is covered by a cylinder head or cylinder cover 3, which is provided with passageways 4 through which water is circulated for cooling said head or cover. Also in this head or cover 3 are located an air passageway 5 and a gas passageway 6 and an inlet valve 7 to the cylinder 1. In the cylinder 1 is located a piston 8. These are all of more or less standard construction in Diesel oil-gas engines, with the exception of the gas passageway 6, which is typical of my invention.

The air is supplied to the cylinder 1 at slightly above atmospheric pressure by an exhaust gas driven turbo-blower 9 through an intake pipe 10. The air intake apparatus just described is typical of all turbo-charged Diesel engines.

Located in the air inlet line 10 is a valve 11 mounted on a shaft 12. To one end of the shaft 12 is attached an arm 13, and at the free end of the arm 13 is pivoted, as at 14, a rod 15, an end of said rod being pivotally connected as at 25 to a lever 23, supported as at 24 on the engine frame. Also pivotally mounted on lever 23, as at 25, is a fulcrum pin and spring attachment 21 attached to a rod 22, said rod 22 being provided with a pin 16 mounted to slide in a slot 17 in an extension 18 pivotally mounted at 19 on an arm 20.

The intake valve 7 of the cylinder 1 is mounted in the cylinder head 3 controlling the passageway 26 in which gas from the passageway 6 and air from the passageway 5 are mixed just prior to the introduction of the same into the cylinder 1. The valve 7 is mounted in a guide bushing 27, and the upper end of said valve 7 is supplied with a head 28 against which a coil spring 29 presses for the purpose of restoring the valve to its upper position, as shown in Fig. 1. The arrow in the air passageway 5 indicates the direction of travel of said air.

The valve 7 is moved downwardly for admitting combined air and gas to the cylinder 1 by a rocker lever 30, which is pivotally mounted at 31 to a bracket (not shown) mounted on the cylinder head. One end 32 of the rocker arm 30 contacts the upper side of the head 28 on the stem of the valve 7 for the purpose of depressing the valve 7 to admit a charge of combined air and gas to the cylinder 1, it being understood that when such downward pressure is released by the upward movement of the end 32 of the rocker arm 30 the spring 29 returns the valve 7 to its upper, closed position. The other end 33 of the rocker arm 30 is provided with a cam roller 34 which rides on a cam 35, which cam rotates in the direction indicated by the arrow. The cam 35 is mounted on a shaft 36. Another cam 37 is also mounted on the shaft 36 and moves in unison with the cam 35. A rocker arm 38 is mounted on the shaft 31, and at its outer end is provided with another cam roller 39, contacting with the cam 37 which controls the gas supply.

Attached to the rocker arm 38 at the point where it is mounted on the shaft 31 is a cam arm 40, which presses against one end of a link 41 pivotally secured to another link 42, the link 42 being pivotally secured to an arm 43 mounted on a shaft 44, the movement of said arm 43 being controlled through another arm 45 mounted on the shaft 44. By the movement of the shaft 44 the links 41 and 42 move upwardly or downwardly on the cam arm 40 for the purpose of admitting varying quantities of gas from zero to full supply, depending on the raised or lowered position of the links 41 and 42.

Figure 2:
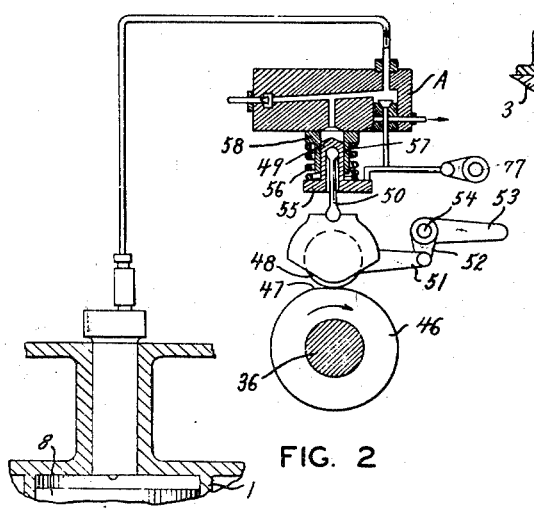
Fig. 2 is a diagrammatic view of the fuel pump and timing control therefor attached to the cylinder of the engine.

In the diagrammatic view in Fig. 2 the fuel pump is shown in cross section. On the shaft 36 is mounted a cam 46 having a nosed portion 47 and on which rides a roller 48. This roller 48 actuates the fuel pump plunger 49 through a rod 50. The timing of the fuel pump can be altered slightly by moving the roller 48 backward or forward through a link 51 and an arm 52, which is mounted on a shaft 54, which also carries a hand lever 53 for operation of the roller control. The fuel pump plunger 49 is provided with a head 55 against which a spring 56 presses for the purpose of moving the fuel pump plunger 49 downwardly. The fuel pump plunger 49 is fitted to a cylinder 57, which is suitably mounted on a pump body A, the upper portion of said cylinder being enlarged as shown at 58 to provide a seat for the upper end of the spring 56. The remainder of the fuel pump A is conventional and is well understood by those skilled in the art, and it is not believed that a detailed description at this point is necessary.

A governor 59 of any conventional type is shown in dotted outline in Fig. 1, which governor is provided with a shaft 60 on which a lever arm 61 is mounted. To the outer end of the arm 61 is pivoted a rod 62, as at 63, said rod being also pivoted at 64 to another lever arm 65 mounted on a shaft 66. On the shaft 66 is mounted a slotted lever 67 which is composed of a double cam runway 68 having upper and lower cam sections. In the cam sections 68 are mounted rollers 69 and 70 carried by a bar 71. The upper end of the bar 71 is pivotally mounted as at 72 on a link 73, the other end of said link 73 being pivoted at 74 to the rocker arm 23 mounted on the shaft 44.

The lower end of the bar 71 is pivotally mounted as at 70 to a link 75, the other end of said link 75 being pivoted as at 76 to lever 20 on shaft 77.

When the parts are in the position as shown in Fig. 1 in full lines, the engine is operating on full gas. When the parts are in the lowest position as shown in dot and dash lines, the engine is operating on full Diesel fuel; for any proportionate combination of the two fuels it is only necessary to set the parts intermediately off the full line or dotted line positions by setting the hand control level 53 to any selected position between full gas or full Diesel fuel.

The quantity of either fuel, gas or oil at the extreme end position, or the total quantity of both fuels at intermediate positions is automatically controlled by the governor 59 acting through rod 62 and shaft 66 on the double cam runway 68 and selectively through rod 73 on the gas mechanism or through rod 75 on the Diesel fuel mechanism.

I claim:

An oil-gas Diesel engine including a combustion chamber, oil and gas passageways associated with said combustion chamber, a valve in said oil passageway for automatically regulating the amount of oil to be supplied to said combustion chamber, a valve in said gas passageway for automatically regulating the amount of gas to be supplied to said combustion chamber, a governor for automatically controlling the quantity of fuel supplied to said combustion chamber, said automatic control comprising a tiltable slotted lever, two connected rollers mounted in said slotted lever and adapted to be manually adjusted therein to regulate the proportion of oil and gas to be supplied to said combustion chamber, and means automatically controllable by a governor to supply an increased or decreased amount of fuel to said combustion chamber solely through tilting movement of said slotted lever.

LESLIE D. CALHOUN.

REFERENCES CITED

The following references are of record in the file of this patent:

UNITED STATES PATENTS

| Number | Name | Date |
|---|---|---|
| 1,796,716 | Lehn | Mar. 17, 1931 |
| 1,833,265 | Schmidt | Nov. 24, 1931 |
| 1,899,869 | Heusser | Feb. 28, 1933 |
| 2,400,247 | Miller, et al. | May 14, 1946 |

FOREIGN PATENTS

| Number | Country | Date |
|---|---|---|
| 373,502 | Great Britain | May 26, 1932 |